Dec. 14, 1965 SHO TAKEUCHI 3,223,338
TAPE DRIVE MECHANISM
Filed July 31, 1963 2 Sheets-Sheet 1

United States Patent Office 3,223,338
Patented Dec. 14, 1965

3,223,338

TAPE DRIVE MECHANISM

Sho Takeuchi, Yokohama-shi, Japan, assignor to Fujitsu Limited, Kawasaki, Japan, a corporation of Japan Filed July 31, 1963, Ser. No. 299,688
Claims priority, application Japan, Aug. 1, 1962, 37/32,911
6 Claims. (Cl. 242—55.12)

My invention relates to a drive system for magnetic tapes, paper tapes, or other such flexible lengths, and more particularly to a drive system for the moving information recorder tape of an electronic computer, wherein the tape must be moved at constant speed and yet be capable of quick stops and starts.

In known devices the speed of recording and reproducing information onto and from tapes is determined by the rotational speed and other characteristics of the rotating capstan which engages the magnetic tape when necessary to drive it. Synchronous motors are used for maintaining the capstan speed constant. However, the speed accuracy of synchronous motors is adversely affected by changes in the frequency of the alternating power supply energizing it. Moreover, it is difficult to operate synchronous motors at multiple speeds. Thus, present systems have some disadvantages.

Also, such capstans rotate continuosly and do not engage the tape while the tape stands still. Only when the tape is to start does the rotating capstan press it between its periphery and a pinch roller to advance it, releasing when the tape is to stop. This periodic engagement and disengagement tends to damage the tape, particularly if the capstan and the pinch roller become misaligned. Devices to alleviate this problem have effected no fundamental solution but only decreased the degree of the damage to the tape.

Thus it is an object of my invention to provide a tape driving apparatus eliminating the defects of hitherto known devices.

More particularly, it is an object of the invention to provide a tape drive system which will not damage the tape and which will operate independently of the power supply frequency.

Another object of the present invention is to provide a tape feeding mechanism capable of high speed without applying a twisting force to the tape.

Still another object of the invention is to provide a tape driving mechanism capable of starting and stopping the tape rapidly.

Yet another object of the invention is to provide a tape driving mechanism with a braking device permitting instantaneous stopping of the tape feed.

To this end and in accordance with a feature of my invention I drive a tape by means of a capstan continuously engaging the tape and which in turn is driven by a low inertia D.C. motor or an oil-hydraulic pulse motor whose speed is maintained constant by means of a feedback device. According to another feature of my invention the start and stop operation of the tape is not performed by engaging and disengaging the tape but with constantly rotating capstans and by starting and stopping the capstans with the low inertia D.C. drive motor or oil-hydraulic pulse motor.

Other features of novelty characterizing the invention will be pointed out in the claims forming a part of the present specification. Other objects and advantages of the invention will become obvious from the following detailed description of the invention when read in light of the accompanying drawings, wherein:

Figure 1:
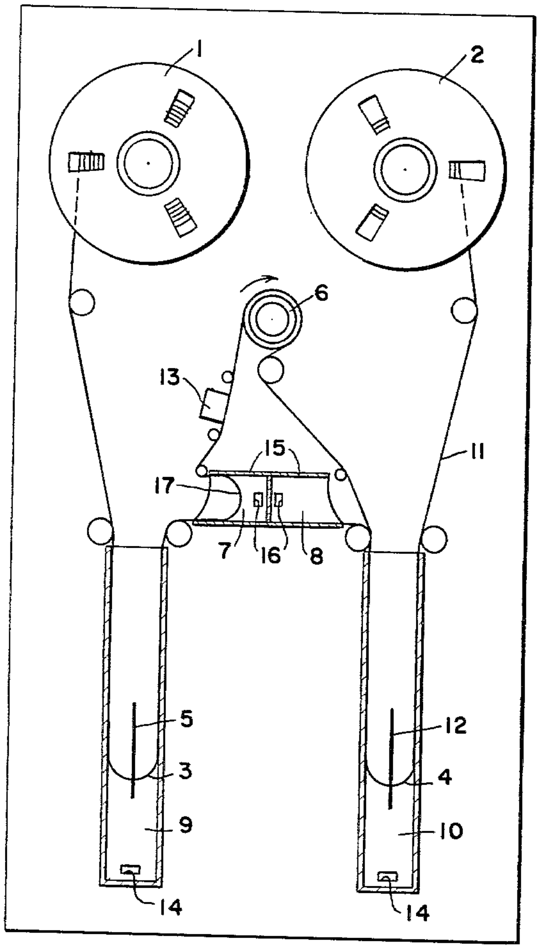
FIG. 1 is a front elevation schematically showing a driving mechanism according to the invention.

In FIG. 1 a pair of tape reels 1 and 2 hold a spool of magnetic tape which is driven through a pair of loops 3 and 4 in respective vacuum studs or open chambers 9 and 10 which are exhausted through holes 14. Between the tape loops 3 and 4 the tape passes through a damper unit 7 around a capstan 6, past another damper unit 8 at a speed determined by the capstan. Engaging the tape between the damper unit 7 and the capstan 6 is a magnetic pickup head 13. The vacuum chambers 9 and 10 maintain the tension on the tape substantially constant by virtue of the exhaust through holes 14 constantly drawing the tape loops 3 and 4 downwardly toward equilibrium positions.

When the magnetic tape 11 is first driven in the direction of the arrow by the capstan 6 the reels 1 and 2 momentarily stand still. As the tape is drawn out of the vacuum chamber 9 by the capstan 6 and into the vacuum chamber 10 by the suction through holes 14 tape detectors 5 and 12 will detect the rise of the tape in stud 9 and the fall of the tape in stud 10. More specifically the detectors 5 and 12 sense the change in pressure caused by movement of the tape loops. The respective detectors 5 and 12 now initiate counter-clockwise rotation of the reels 1 and 2 until sufficient tape enters the stud 9 and leaves the stud 10 to return the tape to equilibrium position.

Vacuum holes 16 provide the suction path to a vacuum pump for maintaining the vacuum within the dampers 7, 8.

By virtue of the adjustments provided in the studs 9 and 10 by means of the detectors 5 and 12 movement of the tape 11 by the capstan 6 produces movement of the reels 1 and 2 and maintains a constant tension upon the tape. Thus, the tape 11 is wound up to the tape reel 2 from the tape reel 1 through the vacuum stud 9, damper unit 7, magnetic head 13, capstan 6, damper unit 8 and vacuum stud 10. In a similar manner the tape 11 may be driven in a reverse direction so that the reel 1 takes up tape from the stud 9 past the head 13 and the reel 2 supplies tape into the stud 10.

Figure 2:
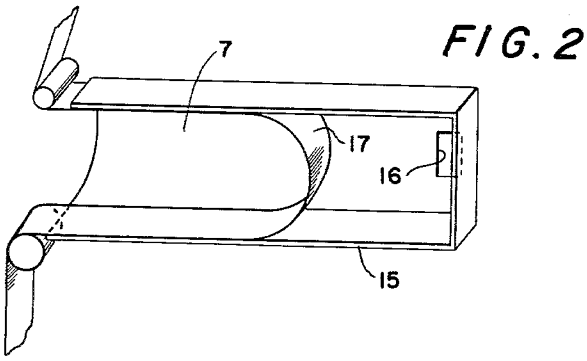
FIG. 2 is a detailed perspective drawing of a vacuum chamber in FIG. 1.

The tape damper units 7 and 8 provide the necessary smoothness of operation. These are constructed as shown for example in FIG. 2 wherein the unit 7 is shown in perspective, with the front panel removed. Reference character 15 indicates the tape damper unit body, the tape absorber holes being shown as 16, the tape loop unit as 17. As stated, the suction hole 16 evacuates the stud interior for drawing the tape inside.

By virtue of this arrangement the constant amount of tension and damping action is generated between the capstan 6 and the vacuum chambers so as to insure stability when the tape runs past the magnetic head. Tape vibration due to rotation of the tape reels 1 and 2 as well as the vacuum stud 9 and the tape loop unit 17 is prevented from affecting the magnetic head 13. Moreover, in winding the tape 11 from the tape reel 2 back to the tape reel 1 high speed winding operation may be accomplished by rapid rotation by the capstan 6.

Figure 3:
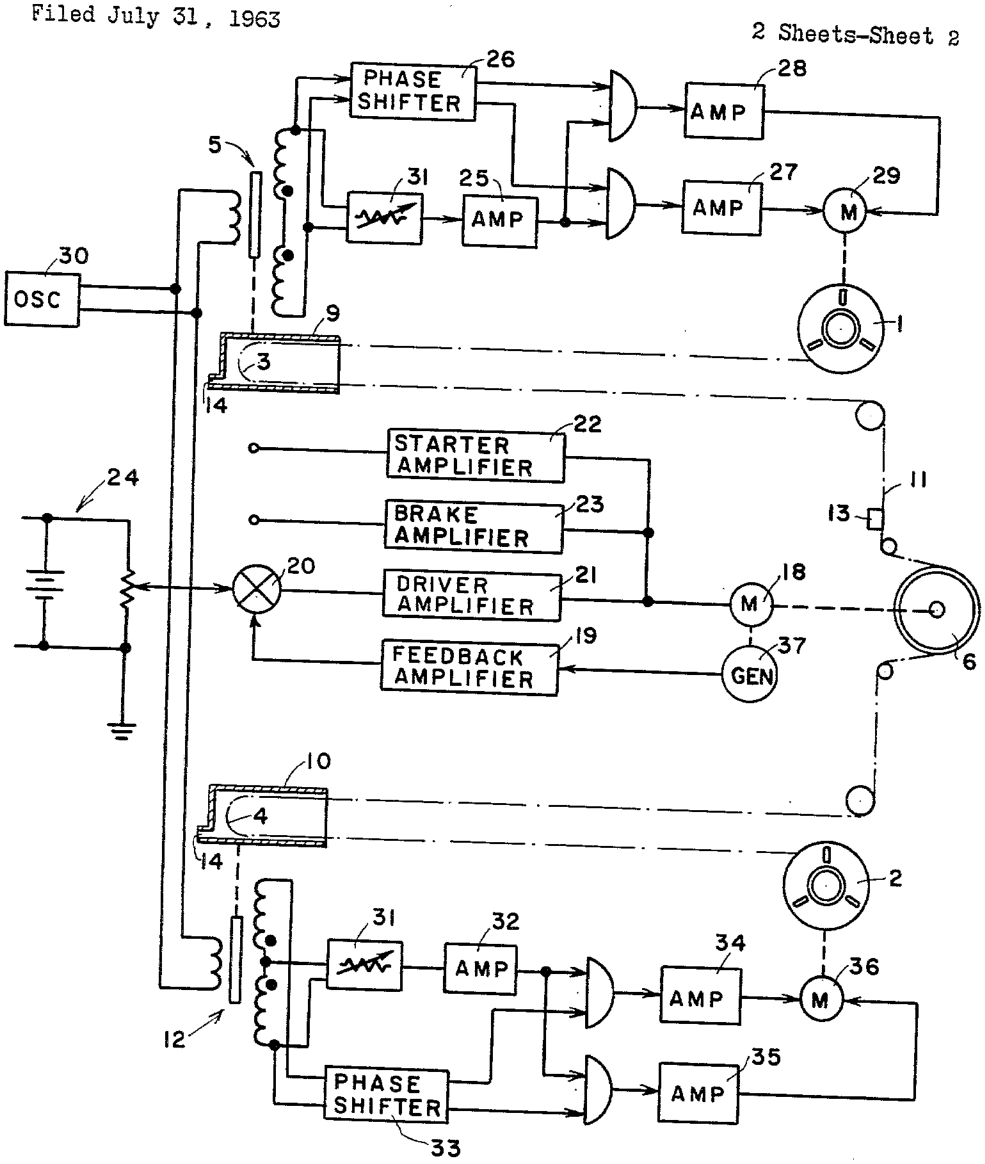
FIG. 3 is a block diagram for the control system of the tape driving mechanism shown in FIG. 1.

FIG. 3 is a block diagram of a control circuit for the drive shown in FIG. 1. A low inertia, direct current or pulse oil-hydraulic capstan motor 18 rotates the capstan 6 to which it is coupled by means of a shaft. A speed detector generator 37, also coupled to the capstan motor 18 by means of a shaft, connects to a feedback device 19 which provides a voltage input to a comparator 20. A speed reference voltage circuit 24 constituting a constant voltage continuously-charged battery with a tapped output for variable speeds, provides a second input to the comparator 20. The resulting signal between the feedback and the speed reference voltage actuates a driving amplifier 21 which maintains the motor 18 at a constant running speed dependent upon the speed reference circuit 24. Any suitable braking arrangement known in the art may be utilized to brake or stop the motor 18. Thus, for example, a manually operated stop button (not shown) may be operated to produce a stop signal by any suitable means. The stop signal may be amplified in an amplifier 23, which may comprise any suitable amplifier known in the art. Application of the output signal from a brake amplifier 23 which is actuated as necessary, stops the motor 18 and hence the capstan 6 and tape 11. Any suitable starting arrangement known in the art may be utilized to start the motor 18. Thus, for example, a manually operated start button (not shown) may be operated to produce a start signal by any suitable means. The start signal may be amplified in an amplifier 22, which may comprise any suitable amplifier known in the art. An output signal from a starting amplifier 22, also actuated as desired starts the motor 18 as desired.

The tape speed can be adjusted by varying the speed reference voltage in the speed reference circuit 24. Thus, any desired speed may be obtained according to the present invention.

When the capstan 6 rotates in a clockwise direction and drives the tape 11, it pulls some of the tape out of the stud 9, thus changing the vacuum pressure therein. The detector 5, constituting a pressure transducer of the differential transformer type senses this pressure change when its transformer core is drawn further toward the chamber 9 thereby changing its position relative to the transformer windings. The transformer windings are energized by an oscillator 30 connected to the primary. The secondary windings are differentially connected so that their combined output voltage is indicative of the pressure change. The signal then passes to an amplifier 25 through a sensitivity control 31. Also receiving the signal from the detector 25 is a phase shifter 26. The phase shifter and amplifier pass respective signals through respective logic circuits to motor drive circuits, or power amplifiers 27 and 28 for driving a motor 29 of the D.C. or pulse oil-hydraulic type in the clockwise direction so as to feed additional tape into the stud 9 thereby maintaining the initial position and pressure relation of the tape loop 3 within the stud. Meanwhile, rotation of the capstan 6 allows the suction to draw additional tape into the chamber 10 so that the position of, and pressure under, loop 4 is changed. This change is detected by detector 12 which corresponds to detector 5 and provides a signal corresponding to the change in pressure to an amplifier 32 and a phase shifter 33. A pair of logic circuits pass the outputs of the units 32 and 33 to motor drives or power amplifiers 34 and 35 so as to regulate a motor 36 to rotate in a clockwise direction. The reel 2 now draws the excess tape from the stud 10, so as to return the loop 4 to its initial position and the detector balances.

According to the present invention, the capstan 6 unit and the tape damper unit operate in close relation rather than independently as heretofore. The high speed tape driving device enabling quick start and quick stop operation and does not require that large tensioning and twisting forces be applied to the recording tape.

There is provided a single capstan for driving the tape forward and in the reverse direction. Each one of the vacuum chambers provides a constant amount of tension to the tape 11 without reducing tension to an undesirable point. This is true with regard to both the windup reel and the feedout reel. The two tape reels are connected directly to separate motors thereby enabling the high speed driving of the reel by free selection of speed in both directions and enabling a wide range of capstan speeds.

According to the present invention an approximately constant tape length is maintained at a loop in the vacuum chamber for providing tape tension. One of these two loops of tape provides a constant amount of tension to the tape which is being driven and the other permits winding up the tape without applying any tension to the tape.

While an embodiment of the invention has been described in detail, it will be obvious to those skilled in the art that the invention may be practiced otherwise.

I claim:

1. A tape driving system, comprising a pair of spaced tape reels supporting upon them and between them a single magnetizable tape, vacuum means acting upon a portion of said magnetizable tape intermediate said reels for adjusting the tension upon said tape, a single rotatable capstan directly engaging the intermediate portion of said tape for driving said tape in either direction, magnetic read-in and read-out means in operative proximity with said tape, a D.C. motor directly coupled to said capstan for rotating said capstan in either direction, starting means coupled to said D.C. motor for starting rotation of said capstan, and braking means coupled to said D.C. motor for stopping rotation of said capstan.

2. A tape driving system, comprising a pair of spaced tape reels supporting upon them and between them a single magnetizable tape, vacuum means acting upon a portion of said magnetizable tape intermediate said reels for adjusting the tension upon said tape, a single rotatable capstan directly engaging the intermediate portion of said tape for driving said tape in either direction, magnetic read-in and read-out means in operative proximity with said tape, a D.C. motor directly coupled to said capstan for rotating said capstan in either direction, starting means coupled to said D.C. motor for starting rotation of said capstan, braking means coupled to said D.C. motor for stopping rotation of said capstan, and winding means for said reels for turning said reels and winding said tape from one of said reels to the other.

3. A tape driving system, comprising a pair of spaced tape reels supporting upon them and between them a single magnetizable tape, vacuum means acting upon a portion of said magnetizable tape intermediate said reels for adjusting the tension upon said tape, a single rotatable capstan directly engaging the intermediate portion of said tape for driving said tape in either direction, magnetic read-in and read-out means in operative proximity with said tape, a D.C. motor directly coupled to said capstan for rotating said capstan in either direction, starting means coupled to said D.C. motor for starting rotation of said capstan, braking means coupled to said D.C. motor for stopping rotation of said capstan, and suction means engaging said tape between said vacuum means and said capstan for stabilizing the tape speed.

4. A tape driving system, comprising a pair of spaced tape reels supporting upon them and between them a single magnetizable tape, vacuum means acting upon a portion of said magnetizable tape intermediate said reels for adjusting the tension upon said tape, a single rotatable capstan directly engaging the intermediate portion of said tape for driving said tape in either direction, magnetic read-in and read-out means in operative proximity with said tape, a D.C. motor directly coupled to said capstan for rotating said capstan in either direction, starting means coupled to said D.C. motor for starting rotation of said capstan, braking means coupled to said D.C. motor for stopping rotation of said capstan, and winding means for said reels for turning said reels and winding said tape from one of said reels to the other, said winding means including a D.C. motor for each reel, said vacuum means including a pair of vacuum studs each engaging and driving the intermediate portion of said tape adjacent respective ones of said reels to equilibrium positions within the studs, respective sensing means in said studs for detecting the departure of said tape from the equilibrium position, and respective control means responsive to said sensing means and connected to the motors of said reels for actuating said reels to return said tapes to their equilibrium positions.

5. A tape driving system, comprising a pair of spaced tape reels supporting upon them and between them a single magnetizable tape, vacuum means acting upon a portion of said magnetizable tape intermediate said reels for adjusting said tension upon the tape, a single rotatable capstan directly engaging the intermediate tape portion of said tape for driving said tape in either direction, magnetic read-in and read-out means in operative proximity with said tape, a hydraulic motor directly coupled to said capstan for rotating said capstan in either direction, starting means coupled to said hydraulic motor for starting rotation of said capstan, and braking means coupled to said hydraulic motor for stopping rotation of said capstan.

6. A tape driving system, comprising a pair of spaced tape reels supporting upon them and between them a single magnetizable tape, vacuum means acting upon a portion of said magnetizable tape intermediate said reels for adjusting the tension upon said tape, a single rotatable capstan directly engaging the intermediate tape portion of said tape for driving said tape in either direction, magnetic read-in and read-out means in operative proximity with said tape, a hydraulic motor directly coupled to said capstan for rotating said capstan in either direction, starting means coupled to said hydraulic motor for starting rotation of said capstan, braking means coupled to said hydraulic motor for stopping rotation of said capstan, and winding means for said reels for turning said reels and winding said tape from one of said reels to the other, said winding means including a hydraulic motor for each reel, said vacuum means including a pair of vacuum studs each engaging and driving the intermediate portion of said tape adjacent respective ones of said reels to equilibrium positions within the studs, respective sensing means in said studs for detecting the departure of said tape from the equilibrium position and respective control means responsive to said sensing means and connected to the motors of said reels for actuating the reels to return said tapes to their equilibrium positions.

References Cited by the Examiner

UNITED STATES PATENTS

| | | | |
|---|---|---|---|
| 2,277,136 | 3/1942 | Newman | 226—43 X |
| 2,831,678 | 4/1958 | MacNeill | 242—55.12 |
| 3,050,594 | 8/1962 | Bick et al. | 242—55.12 X |

MERVIN STEIN, *Primary Examiner.*

Disclaimer 3,223,338.—*Sho Takeuchi*, Yokohoma-shi, Japan. TAPE DRIVE MECHANISM. Patent dated Dec. 14, 1965. Disclaimer filed July 8, 1969, by the assignee, *Fujitsu Limited.*

Hereby enters this disclaimer to claims 5 and 6 of said patent.

[*Official Gazette August 26, 1969.*]